(12) United States Patent
Everett et al.

(10) Patent No.: US 8,711,504 B1
(45) Date of Patent: Apr. 29, 2014

(54) DISK DRIVE WITH A SUBSET OF SECTORS WITH REDUCED WRITE-TO-READ GAP

(71) Applicant: HGST Netherlands B.V., Amsterdam (NL)

(72) Inventors: Timothy John Everett, Niwot, CO (US); James Bowling French, Jr., Longmont, CO (US); Gary Allan Herbst, San Jose, CA (US); Anthony Edwin Welter, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/718,278

(22) Filed: Dec. 18, 2012

(51) Int. Cl.
*G11B 5/00* (2006.01)
(52) U.S. Cl.
USPC .......................... 360/49; 360/77.08; 360/78.14
(58) Field of Classification Search
None
See application file for complete search history.

(56) References Cited

U.S. PATENT DOCUMENTS

| 6,104,568 | A | 8/2000 | Drouin et al. |
| 7,110,209 | B2 | 9/2006 | Ehrlich et al. |
| 7,349,167 | B2 | 3/2008 | Erden et al. |
| 7,551,379 | B2 | 6/2009 | Yu et al. |
| 7,663,830 | B2 | 2/2010 | Jo et al. |
| 2011/0149433 | A1 | 6/2011 | Coker et al. |
| 2011/0181977 | A1 | 7/2011 | Kim et al. |
| 2012/0087036 | A1 | 4/2012 | Hirano et al. |

FOREIGN PATENT DOCUMENTS

WO   WO/99/06992   2/1999

*Primary Examiner* — Regina N Holder
*Assistant Examiner* — Brian Butcher
(74) *Attorney, Agent, or Firm* — G. Marlin Knight

(57) ABSTRACT

Disk drives are described in which the conventional write-to-read gap is omitted in selected sectors which frees up space that can be used for other purposes including writing a higher number of bits in the user data area in the gapless selected sectors. Alternative embodiments can use the additional space for servo information such as a repeatable run out (RRO) field. Conventional servo sector SID formats can be used for both gapped and gapless SIDs, which means that during seeking and reading operations full SIDs can be read for every wedge. The tradeoff for being able to write data much closer to the gapless SIDs is that the servo system does not detect the SAM or read the TID in the gapless SIDs during write operations.

18 Claims, 4 Drawing Sheets

DISK DRIVE WITH A SUBSET OF SECTORS WITH REDUCED WRITE-TO-READ GAP

FIELD OF THE INVENTION

This invention relates generally to information storage systems, and more particularly to servo patterns on recording disks and servo positioning systems that selectively position transducers (heads) over tracks on the disks while the disks rotate.

BACKGROUND

FIG. 1 is a block diagram illustrating an information storage system (disk drive) 110 according to of the prior art. Disk drives have one or more disks 111 on which ferromagnetic thin materials are deposited. The disk drive includes data recording disk 111, pivoting actuator arm 113, and slider 112 that includes a read head and a write head. The functional blocks include servo system 90, read/write electronics 114, interface electronics 115, controller electronics 116, microprocessor 117, and RAM 118. A disk drive can include multiple disks stacked on a hub that is rotated by a disk motor, with a separate slider for each surface of each disk.

The term servo wedge 120 will be used to mean the contiguous set of servo fields extending from ID to OD on the disk. Disk 111 will typically have multiple servo wedges 120 arranged radially around the disk, but only two are shown for simplicity. Information recorded on the disks is generally organized in concentric tracks. As part of the manufacturing process permanent servo information is recorded on the disks that provides information to the system about the position of the heads when the disks are rotating during operation. The servo data on the disk provides several fundamental functions and is conventionally arranged in distinct fields in each of the plurality of servo wedges angularly spaced around the disk.

FIG. 2B illustrates the fields in a selected servo ID (SID) 21. The preamble precedes Servo Address Mark (SAM) which is a timing mark which is used to synchronize data within the servo fields, and also provides timing information for write and read operations in the data portions of the disk. Second, the SID supplies a multi-bit digital field, which provides a coarse track-ID (TID) number and additional information to identify the physical SID number. The TID is typically written in Gray code as the presence or absence of recorded dibits. During seek operations, when the head is moving across tracks, the head can typically only read a portion of the Gray-code in each TID. The Gray-code is constructed so that pieces of the TID, in effect, can be combined from adjacent tracks to give an approximate track location during a seek.

The SID also supplies a position error field, which provides the fractional-track Position Error Signal (PES). Auxiliary functions, such as amplitude measurement or repeatable runout (RRO) fields are sometimes also used. During read or write operations the drive's servo control system uses the PES servo information recorded on the disk surface as feedback to maintain the head in a generally centered position over the target data track. The typical PES patterns include either two or four bursts that are identical sets of high frequency magnetic flux transitions. FIG. 2B shows an example using only two PES bursts. The PES bursts are arranged in a pattern which generates a signal in the read head that is a function of the position of the read in relation to the centerline of the track. For example, the A and B bursts can be radially offset from each other by a half a track width and are sequential in the circumferential direction. Unlike the track-ID (TID) field number, the conventional PES bursts do not encode numerical information. The PES burst pattern is repeated for each set of two or four tracks, so only local information is provided. Variations of the standard PES burst pattern have been described such as the dual frequency, dual burst servo patterns described by Serrano, et al. in U.S. Pat. No. 6,078,445.

The write-to-read gap 23 is included to allow for the physical separation between the write head 32 and the read head 33 in slider 31 and to provide the time/distance needed to switch from writing data to reading the next servo sector ID (SID) 21. (See FIG. 2A). The bulk of the write to read gap is caused by the physical separation between the writer and reader. In most head designs, the reader leads the writer, so when the writer reaches the end of the data sector, the reader is already some distance beyond the end of the data sector. In addition some gap is needed to allow for the time needed for the drive's control systems to switch from writing to reading, but this switching gap is much smaller than the physical writer to reader separation. Accordingly servo systems have typically included a gap 23 in the track format between the end of a writable data sector and the start of the following servo sector information. A complicating factor in minimizing the needed gap is that the geometrical relationship (skew) between the heads and the track varies with the position of the mechanical actuator that move the slider with the heads in an arc across the disk surface.

U.S. Pat. No. 7,551,379 by Yu, et al. (Jun. 23, 2009) describes a system in which the write element leads the read element in the tangential direction of rotation of the magnetic disk. The servo sector information is arranged such that information that is not needed for write operation is placed at the end of the servo sector. In this way, the servo read operation can be terminated sooner and the write operation can initiate sooner after going over the servo sector. The write element in a write operation writes data to the data sector of a track until an end of the data sector before reaching a front end of a servo sector following the end of the data sector. The read element reads information in the servo sector needed for the write operation. The write element starts writing data in a next data sector following the servo sector after the write element reaches the next data sector and after the read element has read all information in the servo sector needed for the write operation.

In U.S. Pat. No. 6,104,568 to Drouin, et al. (Aug. 15, 2000) a pattern of odd even servo sectors is described in which the odd SIDs have an abbreviated TID Gray code.

PCT application WO/1999/006992 by Zaharris describes a pattern of servo fields that include mini-servo fields with shorter PES bursts that are placed in between normal servo sector SIDs around a track.

Each of these servo related functions including the write-to-read gap typically consumes a relatively independent portion of each track in prior art servo systems. Typically, these servo related fields can consume a significant portion of the recording surface of the disk and are an attractive target for reduction.

SUMMARY OF THE INVENTION

Embodiments of the invention include disk drives in which the conventional write-to-read gap is omitted in selected sectors which frees up space that can be used for other purposes including writing a higher number of bits in the user data area in the gapless selected sectors. Alternative embodiments can use the additional space for servo information such as a repeatable run out (RRO) field. A much smaller gap should still exist between the user data and the subsequent gapless SID patterns for servo tolerances and electronic system switching time. In embodiments the much smaller tolerance/switching gap is sufficient to avoid overwriting the SID when writing data. The selected user data areas will be referred to as gapless user data areas (even though it is understood that the small gap is present) and equivalently the SIDs following the gapless user data area will be called gapless SIDs.

The gapless SIDs can be arranged in a repeating pattern in which, for example, every other SID is gapless, or two out of three are gapless, etc. In a preferred embodiment every other SID is gapless. The angular spacing between the SIDs is constant around a track, but more data bits are written in the user data area preceding the gapless SIDs. The designation of which SIDs will be gapless should preferably be made as part of the design and manufacturing process and can remain fixed during the life of the drive.

Conventional servo sector SID formats can be used for both gapped and gapless SIDs, which means that during seeking and reading operations full SIDs can be read for every wedge. The acceptable tradeoff for being able to write data much closer to the gapless SIDs is that the servo system ignores (does not detect) the SAM or read the TID in the gapless SIDs during write operations. Preferably the servo gate control signal is delayed to skip over the SAM and the TID and is then enabled for the PES bursts. The PES bursts in the gapless SIDs are used during read and write operations, so track-following is enabled. Track-following requires only the PES bursts since the fine position information is fully contained within the bursts. Generally, the timing loop requires less bandwidth than the track following loop and can function properly with updates at only half the frequency of the position loop. For the gapless SIDs the servo system reads only the PES bursts after writing the preceding data. Thus, for example, when writing consecutive sectors in a format in which every other SID is gapless, the system only reads the SAM and TID on every other SID, but the PES bursts are read for every SID. Seeking and read operations can read and use TID Gray code in any/all servo sectors. Servo operation for read operations is not affected the gapless SIDs; however, there is more data to be read in the sector ahead of the gapless SIDs.

In one alternative embodiment RRO fields are included in gapped SIDs that are fully read during writes. In this alternative the space that is freed up by eliminating a subset of gaps is used for RRO fields. By extending the full SIDs equally in both directions (SAM and TID on the front side, RRO fields on the back side), the length of the data regions before the full SIDs and the gapless SIDs become equal (as they conventionally are), minimizing the changes to hardware and firmware needed to read and write data.

DETAILED DESCRIPTION OF THE INVENTION

Because of the physical offset between the read head and write head in the slider, it is typical to have a fairly large gap of unwritten media between the end of the data sector and the beginning of the servo sector. By eliminating some of these write-to-read gaps the invention frees up media space that can be used for other purposes. In some embodiments the extra space is used to write additional data bits in the gapless sectors. Alternative embodiments keep the data sectors equal in length and use the additional space for a dual RRO field.

Embodiments of the invention reduce format overhead of selected servo sectors by enabling writing of data closer to the subsequent servo sector ID (SID) for selected gapless SIDs, i.e. writing in the area that is reserved for write-to-read gap in conventional drives. The additional space can be used, for example, to expand the user data area in selected sectors to contain a higher number of data bits. In addition to the modifications described herein for the servo system, other changes in disk drive's systems may be required to accommodate the two different user data sizes. Other embodiments of the invention can use the additional space for an RRO field, for example, and keep the user data fields all of equal size. In each either embodiment the disk drive systems must be adapted to provide timing for the writes after the gapless SIDs based on the SAM timing from the previous full SID.

Figure 1:
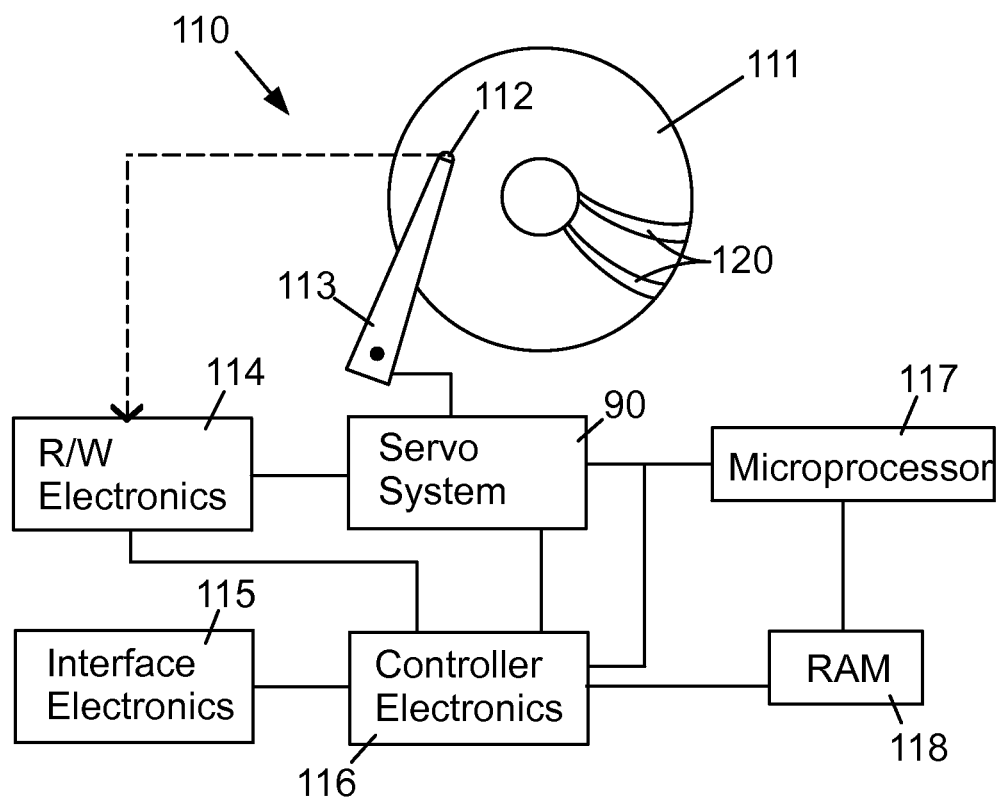
FIG. 1 is an illustration of selected block functions of a prior art disk drive.
Figure 2A:
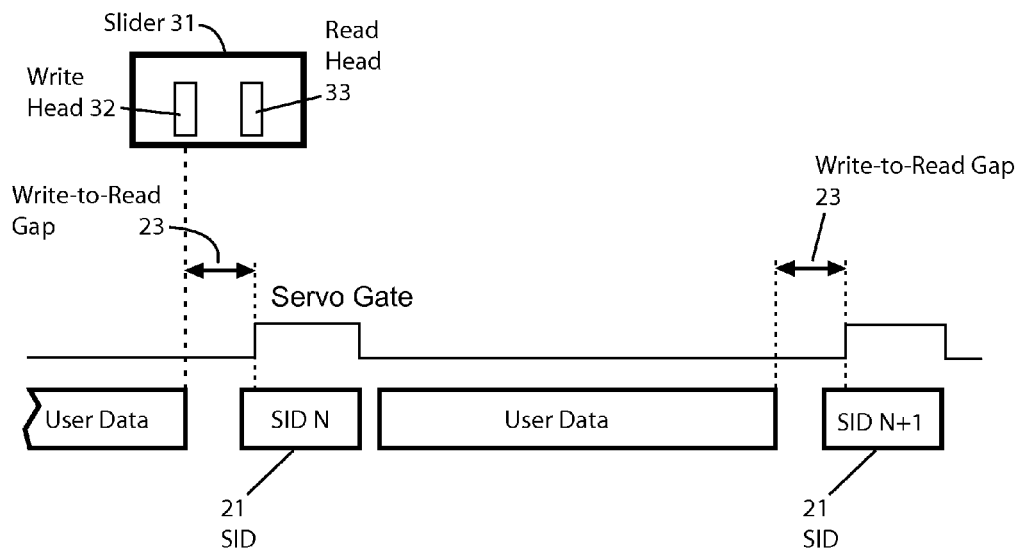
FIG. 2A is an illustration of servo fields arrangement on a track in a prior art disk drive.
Figure 3A:
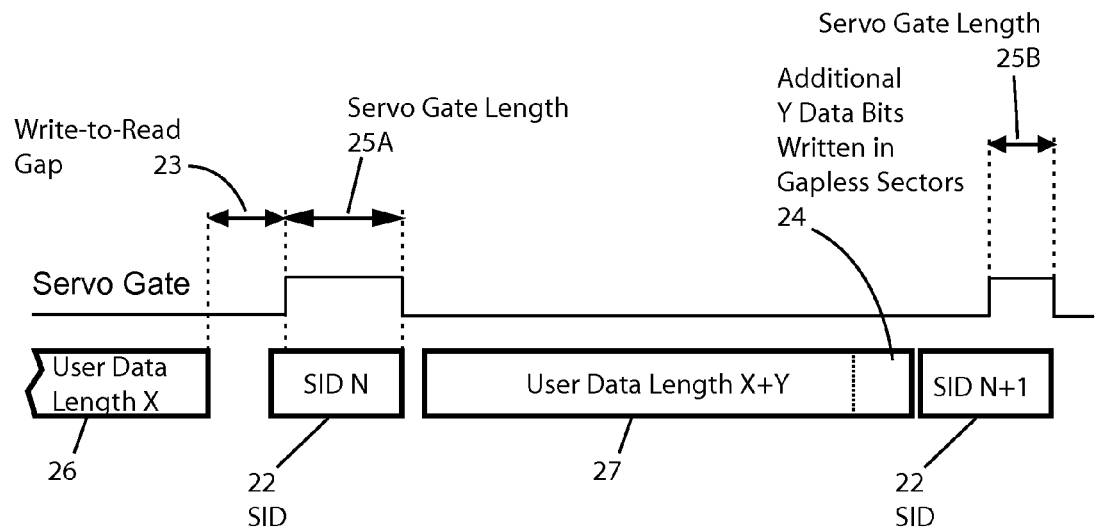
FIG. 3A is an illustration of servo fields arrangement on a track in a first embodiment of the invention.
Figure 3B:
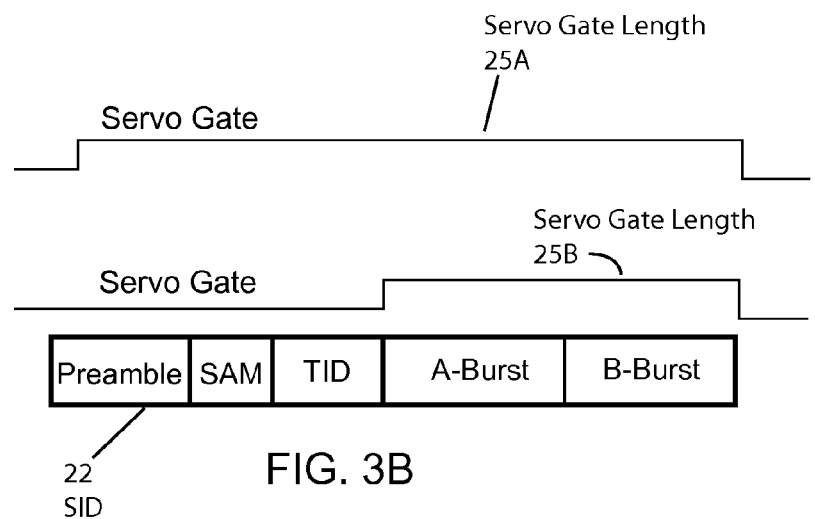
FIG. 3B is an illustration of fields in a first SID type in a first embodiment of the invention.

FIG. 3A is an illustration of servo fields arranged on a track in an embodiment of the invention. Two selected consecutive SIDs (N & N+1) 22 are illustrated. The slider with the read and write heads will pass over SID N first as the disk rotates, i.e. SID N+1 is down-track from SID N. As shown in FIG. 2A the read head is typically physically ahead of the write head in the slider, so when the write head writes the last bit of the user data, the read head is already farther down track. The track will have many more such SIDs arranged in a repeating pattern. The internal structure/content of the fields of the SIDs 22 can be according to the prior art in some embodiments. For example, the TID can be encoded using a conventional Gray code and the PES bursts can be according to the prior art as shown in FIG. 3B.

The spacing between the SIDs is also constant around a track just as is the case in the prior art. Because each of the SIDs have the preamble, SAM and TID fields, they can all be read during seeking operations. Accordingly the ability of the servo system to read the TIDs and know where the head is, is not reduced in embodiments of the invention.

As illustrated in FIG. 3A, the SID N+1 will be called a gapless SID according to the invention, because user data 27 including additional Y data bits 24 has been written in the area preceding the SID N+1. As shown in the illustration, user data 26 preceding SID N has X data bits and has a substantial write-to-read gap 23 preceding it, and the SID N+1 has no substantial write-to-read gap. In other words, the last bit of user data 27 is substantially closer to the SID N+1 than is the case for user data 26. In practice a small tolerance gap will still exist between the data and the start of SID N+1 to allow for inherent variations in timing and positioning during drive operation and time needed to switch from writing to reading. The required tolerance gap is substantially smaller than the write-to-read gap.

The gapless SIDs can be arranged in a repeating pattern such as every other one (odd and even) as shown in FIG. 3A, which is a preferred embodiment. Other patterns can be used as well. For example, embodiments can have two gapless sectors for each one with a write-to-read gap. Similarly the ratio of gapless sectors can be 3:1, 4:1, etc. The trade-off for higher ratios of gapless SIDs is the reduced frequency of SAM/TID reading during write operations.

In the prior art, full position and timing information can typically be read from all of the servo sectors while writing data to the disk. In embodiments of the invention, the servo gate timing and read channel configuration are modified to read only the fractional track fine position information from the PES bursts signals in the gapless subset of the servo sectors when writing the preceding sector of user data.

As shown in FIG. 3A, the servo gate length 25A for the gapped SID 22A is significantly longer than the servo gate length 25B for the gapless SID 22B during write operations. The servo gate length 25A is consistent with conventional servo system operation, but servo gate length 25B is less because the start of the servo gate pulse is delayed until the read head is in position to read the A-burst as illustrated in FIG. 3B.

The embodiments described above are the most straightforward from a servo system perspective, but having different length data sectors adds complexity to other systems in the disk drive. An alternative embodiment will be described that keeps the data sectors equal in length and uses the additional space for a dual RRO field. Preferably the RRO field data is exactly the same length as the space freed up by eliminating the gaps. Some disk drive designs do not use RRO fields, so this alternative it not useful in those cases.

The RRO fields cannot be moved independently from the other fields in the SID, so the RRO field cannot be placed directly into the space in front of the gapless SIDs. Instead the RRO fields are placed at the end of the gapped SIDs (i.e. at the beginning of the "gapless user data area" instead of the end of the "gapless user data area") then the gapless user data area remains the same length, it is just delayed by the length of the RRO field. In comparison to a standard RRO implementation, the RRO fields are removed from the end of every SID, bundled into a "dual-RRO field" and added onto the end of every gapped SID. This increases both gapless and gapped user data areas by the length of the original RRO fields.

Figure 4A:
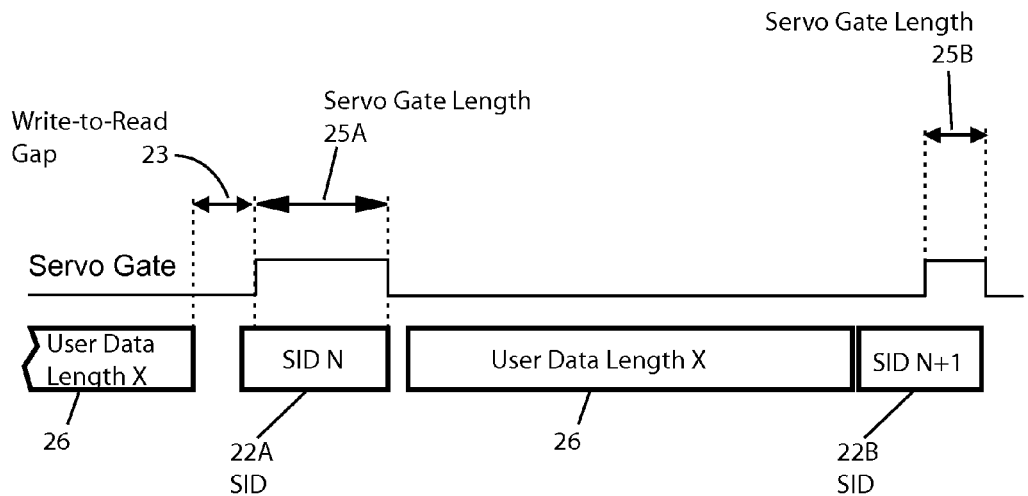
FIG. 4A is an illustration of servo fields arrangement on a track in a second embodiment of the invention.
Figure 4B:
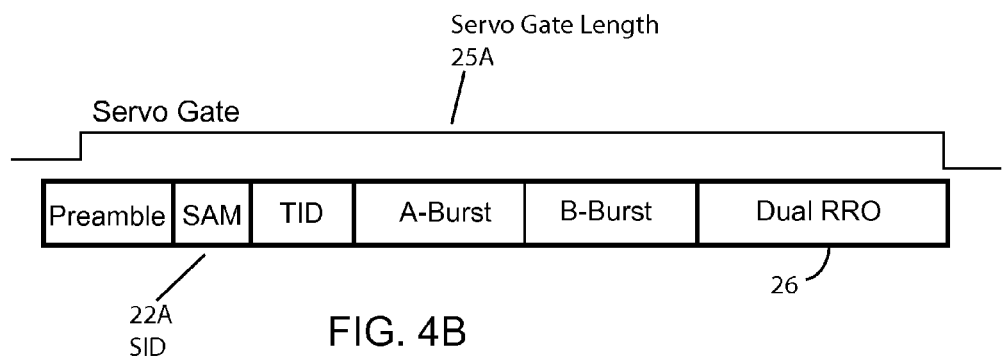
FIG. 4B is an illustration of fields in a first SID type in a second embodiment of the invention.
Figure 4C:
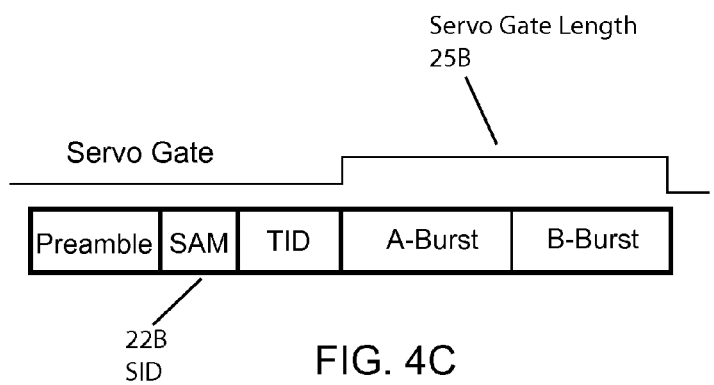
FIG. 4C is an illustration of fields in a second SID type in a second embodiment of the invention.

The SID format can be the same for gapped and gapless SIDs as described above, but in the alternative embodiment illustrated in FIGS. 4A-C, a dual RRO field can be included in the gapped SID and omitted in the gapless SIDs. FIG. 4A illustrates the sector structure in this embodiment. The additional space that is freed up by omitting the write-to-read gap is used by the dual RRO field 26. The dual RRO field 26 is larger than a comparable single RRO field. If the gapless sector is reduced equally at the front end (partial preamble SAM and TID) and the backend (RRO field) then the data sectors are extended equally for the gapped sectors and the gapless sectors.

Figure 2B:
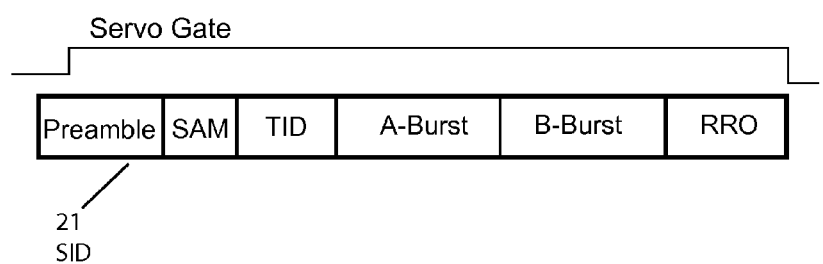
FIG. 2B is an illustration of the fields in an SID in a prior art disk drive.

FIG. 4B is an illustration of fields in the first SID type 22A, i.e. one having a write-to-read gap 23 preceding it. In this embodiment the optional dual RRO field 26 is included only in the gapped SIDS and includes correction values for the both gapped and gapless SIDS. In FIG. 2B (prior art), there is an RRO field on every SID, so there is only one correction value per RRO field. In this embodiment, there is one RRO field for every two SIDS, so there should be two correction values in each RRO field, hence the term "dual RRO field". The timing/length of the servo gate signal 25A is shown above the respective fields. The servo gate signal is turned on during the preamble field and goes off at the end of the RRO field 26. As an example, the duration of the servo gate signal 25A could be on the order of 480 ns for a drive using currently available technology.

FIG. 4C is an illustration of the fields in a second SID type 22B in this embodiment of the invention. The SID 22B includes the preamble, SAM, TID, A-burst, and B-burst just as the SID 22A does, but the dual RRO field 26 is omitted in this embodiment.

Each of the two types of servo fields 22A, 22B still contain the necessary SAM, TID and PES positional information, so full position and timing information are available whenever the drive is not writing data, e.g. seek, error recovery, read, etc).

The timing/length of the servo gate signal 25B for a write operation of the preceding sector is shown above the respective fields for SID 22B. The servo gate signal is turned on only at the start of the A-burst and goes off at the end of the B-burst. Thus, the servo gate signal is off when the SAM and TID pass under the read head and these fields are not used. Accordingly, the servo system is not reading the TID or SAM for the gapless SID 22B when the preceding sector was written, but it is reading the PES bursts and can adjust the fractional track position of the head in the standard way. As an example, the duration of the servo gate signal 25B could be on the order 180 ns for a practical drive, i.e. substantially less than the comparable 480 ns servo gate signal 25A. The length of the fields in FIGS. 4B and 4C are shown in plausible portions relative to each other for a practical embodiment to illustrate the relative space taken up by the dual RRO field 26 and to show the relative reduction in the servo gate length 25B.

In each of the described embodiments of the invention, for the gapless subset of servo sectors for which only the PES position information is read during write operations, the transition from writing to reading occurs later in the SID, allowing data to be written closer to the SID, in what would otherwise be the write-to-read gap between data sector and servo sector. Experimental data has shown an improvement in overall data format efficiency by 0.8 to 1.0% for the invention.

Embodiments of the invention can use any standard technique for delaying the servo gate assertion. One method of delaying the servo gate assertion is to use a prior art read channel feature, which was originally intended to be used to sample additional burst-only servo sectors while on-track. This feature provides the ability to sample PES mini-bursts from every other SID, for example, and will called "mini-burst mode." In the prior art these additional "mini-bursts" cannot be used when the head is seeking, because these burst-only servo sectors have no sync field and no coarse position information, i.e. no SAM or TID.

As described above, when the data ahead of the gapless SID is written, the invention treats the gapless SID as though it only has PES bursts. Viewed in this way, the PES bursts in the gapless SIDs can be treated as mini-bursts and asynchronously sampled without first synchronizing to a preamble.

Embodiments of the invention use this channel feature to sample only the PES bursts on full servo sectors, thus delaying servo gate assertion on those sectors, and enabling writing into what would be the gap between data sector and servo sector in prior art drives. These full servo sectors that are sampled as "mini-bursts" have the same format savings as true "mini-bursts", but unlike true "mini-bursts," can still be used as full SIDS when seeking.

The invention claimed is:

1. A method of operating a disk drive having tracks including a plurality of angularly spaced sector identifications (SIDs) including a preamble field, a servo address mark (SAM) field, a track identification (TID) field and a position error signal (PES) burst field, the method comprising:

writing a first set of data bits preceding a selected SID N on the track with the first set of data bits being positioned with a first sized gap between first set of bits of data and SID N;

detecting the SAM field, the TID field and the PES burst field in SID N;

writing a second set of data bits between the SID N and SID N+1 with the second set of data bits being positioned with a second sized gap between the second set of data bits and SID N+1, where the second sized gap is substantially smaller than the first sized gap;

ignoring the SAM field and the TID field in SID N+1; and detecting the PES burst field in SID N+1.

2. The method of claim 1 wherein the second set of data bits has a higher number of bits than the first set of data bits.

3. The method of claim 1:
wherein detecting the SAM field, the TID field and the PES burst field further comprises asserting a servo gate control signal for a first period of time starting during the preamble field in SID N;

wherein ignoring the SAM field and the TID field in SID N+1 further comprises keeping servo gate control signal inactive; and wherein detecting the PES burst field in SID N+1 further comprises asserting the servo gate control signal for a second period of time to enable the servo system to read the PES burst field in the SID N+1, the second period of time being shorter than the first period of time.

4. The method of claim 3, wherein the second period of time begins after the SAM field in SID N+1 has passed under a read head.

5. The method of claim 1 wherein the SID N includes a repeatable run-out (RRO) field and the SID N+1 does not include a RRO field.

6. The method of claim 5 wherein the RRO field contains correction values for SID N and SID N+1.

7. The method of claim 1 further comprising reading the first set of data bits preceding SID N on the track and detecting the SAM field, the TID field and the PES burst field in SID N; and reading the second set of data bits preceding SID N+1 and detecting the SAM field, the TID field and the PES burst field in SID N+1.

8. A disk drive comprising:
a rotatable disk with a plurality of concentric tracks with a first track including a plurality of angularly spaced sector identifications (SIDs) with each SID including a servo address mark (SAM), a track identification (TID), and a position error signal (PES) burst field, and sectors of data bits recorded between consecutive SIDs, with a first subset of the sectors of data bits being positioned with a write-to-read gap separating the first subset of the sectors of data bits from a subsequent SID in a down-track direction, and a second subset of the sectors of data bits being positioned without a write-to-read gap separating the second subset of the sectors of data bits from a subsequent SID in a down-track direction; and a servo system that only reads the PES burst field in a different subsequent SID after a write operation for a different second subset of the sectors of data bits positioned without a write-to-read gap separating the different second subset of the sectors of data bits from the different subsequent SID.

9. The disk drive of claim 8 wherein the second subset of the sectors of data bits being positioned without a write-to-read gap include a higher number of bits than the first subset of sectors.

10. The disk drive of claim 8 wherein the servo system asserts a servo gate control signal for a first period of time selected to enable a servo system to read the SAM field, a TID field and a PES burst field in SIDs following write-to-read gaps and asserting the servo gate control signal for a second period of time selected to enable the servo system to only read the PES burst field in subsequent SIDs after writing sector of data bits positioned without a write-to-read gap, the second period of time being shorter than the first period of time.

11. The disk drive of claim 10 wherein the first period of time begins when the preamble of an SID following a write-to-read gap is under a read head and extends to cover the PES burst field passing under the read head and the second period of time begins after the SAM field has passed under the read head in the subsequent SIDs.

12. The disk drive of claim 8 wherein SIDs following write-to-read gaps include a repeatable run-out (RRO) field and SIDs without preceding write-to-read gaps do not include a RRO field.

13. The disk drive of claim 8 wherein the PES burst fields are asynchronously sampled in a different subsequent SID after a write operation for the second subset of the sectors of data bits positioned without a write-to-read gap separating the second subset of the sectors of data bits from the different subsequent SID.

14. The disk drive of claim 8 wherein when reading operations are performed for the first and second subset of sectors, detecting the SAM field, the TID field and the PES burst field in each SID.

15. A method of operating a disk drive having tracks including a plurality of angularly spaced sector identifications (SIDs) defining sectors of data, the SIDs including a preamble field, a servo address mark (SAM) field, a track identification (TID) field and a position error signal (PES) burst field, the method comprising:

writing predetermined first subset of sectors of data with a write-to-read gap between the first subset of sectors of data and a following SID;

writing predetermined second subset of sectors of data without a write-to-read gap between the second subset of sectors of data and a different following SID by ignoring the SAM field and the TID field in the different following SID and using the PES burst field in the different following SID; and when reading the first and second subset of sectors of data reading the SAM field, TID field and PES burst field.

16. The method of claim 15 wherein the sectors in the second subset of sectors of data have a higher number of bits than the sectors in the first subset of sectors of data.

17. The method of claim 15 wherein ignoring the SAM field and the TID field in the different following SID and using the PES burst field in the following SID further comprises keeping a servo gate control signal inactive while the SAM field and the TID field pass under a read head.

18. The method of claim 15 wherein SIDs following the first subset of sectors of data with a write-to-read gap between the sectors of data include a dual repeatable run-out (RRO) field.

* * * * *